United States Patent [19]

Allgaier

[11] 4,006,956

[45] Feb. 8, 1977

[54] STRAIN RELIEF DEVICE

[75] Inventor: Werner Allgaier, Sauerlach, Germany

[73] Assignee: Raychem Corporation, Menlo Park, Calif.

[22] Filed: July 14, 1975

[21] Appl. No.: 595,785

Related U.S. Application Data

[63] Continuation of Ser. No. 371,676, June 20, 1973, abandoned.

[30] Foreign Application Priority Data

June 22, 1972 United Kingdom ............ 29275/72

[52] U.S. Cl. .................. 339/103 M; 339/DIG. 1
[51] Int. Cl.² ........................................ H01R 13/58
[58] Field of Search .......................... 339/101–103, 339/DIG. 1; 24/114.5; 174/135, DIG. 8; 285/381, DIG. 10; 403/41, 194, 197

[56] References Cited

UNITED STATES PATENTS

| 3,193,792 | 7/1965 | Shea, Jr. | 339/DIG. 1 |
| 3,305,625 | 2/1967 | Ellis | 339/DIG. 1 |
| 3,388,931 | 6/1968 | Johnson et al. | 285/381 |
| 3,582,457 | 6/1971 | Barthell | 339/DIG. 1 |

FOREIGN PATENTS OR APPLICATIONS

| 1,054,527 | 4/1959 | Germany | 174/DIG. 8 |

Primary Examiner—Joseph H. McGlynn
Attorney, Agent, or Firm—Lyon & Lyon

[57] ABSTRACT

Method and apparatus is provided in which a heat shrinkable member is recovered over an annular disk or the like. The disk includes an aperture therethrough which, along with the unrecovered portion of the heat shrinkable member, provides a pathway for a cable or the like. The unrecovered portion of the heat shrinkable member is recovered onto the cable as a strain relief device.

14 Claims, 2 Drawing Figures

STRAIN RELIEF DEVICE

This is a continuation, of application Ser. No. 371,676, filed Jun. 20, 1973, now abandoned.

BACKGROUND OF THE INVENTION

This invention relates to methods of and devices for relieving strain on members.

More particularly, this invention relates to strain relief devices in hydraulic or electrical conductors or connections utilizing a heat shrinkable member or sleeve.

In electric plugs, for example, which comprise one or more connectors for connecting the pin or pins thereof to one or more cables, the connections may be subject to strains, for example, when an axial or longitudinal stress is applied to the cable. It has hitherto been proposed to relieve such strains by anchoring the cable to the plug body using, for example, a grommet or a clamp whereby any stress is transmitted to the plug body rather than to the connections. The use of a grommet has the disadvantage that an efficient anchorage to the plug body is not usually attainable and the use of a clamp has the disadvantage that usually at least two screws have to be tightened to clamp the cable, which is inconvenient.

The present invention overcomes the prior disadvantages by providing method and apparatus for relieving strain by shrinking or recovering a heat shrinkable member onto an electric cable, an hydraulic hose or the like. The strain relief device comprises a heat shrinkable sleeve (as hereinafter defined) and a member, such as an annular disk. The heat shrinkable sleeve has at a point along its length, preferably at or near an end thereof, a raised portion, preferably in the shape of a circular flange, which raised portion has been formed by heat shrinking the heat shrinkable sleeve onto the member, the member being heat stable below and at the temperature at which the article is shrunk and having an aperture therethrough so that the cable, hose or the like can be passed through the whole length of the heat shrinkable article.

SUMMARY OF THE INVENTION

The present invention provides a method and apparatus for relieving strain utilizing a heat shrinkable sleeve or the like. In an arrangement, a conduit passes through an aperture in a wall wherein a portion of the exterior surface of the conduit within the arrangement has a raised portion which abuts one face of the wall adjacent to the aperture at least when an axial stress is applied to the conduit thereby transmitting the stress to the wall. The raised portion is formed by heat shrinking a heat shrinkable member, for example, a tube or sleeve onto the exterior surface of the conduit and onto a member, such as an annular disk. The disk is heat stable below and at the temperature at which the heat shrinkable member is shrunk, and is disposed between the outer surface of the conduit and the inner surface of the heat shrinkable member. Preferably, the heat shrinkable member has been shrunk about the annular disk before the member is shrunk about the conduit.

The present invention also provides a method of relieving strain on electrical members, especially conductors or connections, in an arrangement where a cable passes through an aperture in a wall, for example, of a plug. A portion of the outer surface of the cable within the arrangement has a raised portion which abuts one face of the wall adjacent to the aperture at least when an axial stress is applied to the cable thereby transmitting the stress to the wall. The raised portion is formed by heat shrinking a heat shrinkable member, for example, a tube or sleeve onto the exterior surface of the cable and onto an annular disk or the like. The disk is heat stable below and at the temperature at which the heat shrinkable member is shrunk. The annular disk is disposed between the outer surface of the cable and the inner surface of the heat shrinkable member. Preferably, the heat shrinkable member has been shrunk about the member before the article is shrunk about the cable.

The present invention further provides an article, for example, an electric cable, a portion of the outer surface of which is provided with a raised portion. The raised portion is formed by heat shrinking a heat shrinkable member, for example, a tube or sleeve onto the outer surface of the article and onto a member, such as an annular disk. The disk is heat stable below and at the temperature at which the heat-shrinkable member is shrunk. The disk is disposed between the outer surface of the article and the inner surface of the heat shrinkable member.

The present invention also provides a kit of parts for effecting the method of the invention comprising a heat shrinkable member, for example, a tube or sleeve and a member having an aperture therethrogh, for example, an annular disk, onto which the heat shrinkable member can be shrunk. The member is heat stable below and at the temperature at which the heat shrinkable article is to be shrunk.

A heat shrinkable member retains its dimemsions under low or normal temperature conditions but at least one dimension is reduced upon heating to a critical temperature.

Cook et al U.S. Pat. No. 3,086,242, Wetmore U.S. Pat. No. 3,396,460 and Heslop et al U.S. Pat. No. 3,526,683, relatng to such heat shrinkable members, all assigned to the assignee of the present invention, are incorporated herein be reference.

The heat shrinkable member may be of, for example, polymers selected from the group consisting of (1) crystalline polymers which exhibit elastomeric properties either at or above their crystalline melting ranges, that is to say thermoplastic polymers and co-polymers such as polytetrafluoroethylene, high molecular weight polypropylene and high molecular weight polyethylene, (2) crystalline polymers and co-polymers, including polyolefins such as polyethylene and polypropylene, which have been cross-linked by chemical methods or by irradiation for example by high energy electrons or ionizing radiation and (3) polymers, for example, polyvinyl chloride, which are relatively rigid up to the critical temperature but which may be deformed above that temperature and which, when cooled to below that temperature while being maintained in the deformed state, will retain the deformation until being raised above the critical temperature in the absence of the deforming force.

As the member, which is heat stable below and at the temperature at which the heat shrinkable member is shrunk, there may be especially mentioned an annular disk, for example, of a metal such as brass, the aperture of which is sufficiently large to receive, for example, a cable. The diameter of the disk should, of course, be large enough to abut against the face of the wall of the arrangement and the diameter of the aperture in the disk may be slightly larger than the external diameter of the cable, so that a given device can be used for a range of cable sizes.

BRIEF DESCRIPTION OF THE DRAWINGS

The invention, both as to its organization and principle of operation, together with further objects and advantages thereof, may be better understood by reference to the following detailed description of an embodiment of the invention undertaken in conjunction with the accompanying drawings in which.

DESCRIPTION OF THE PREFERRED EMBODIMENT

Figure 1:
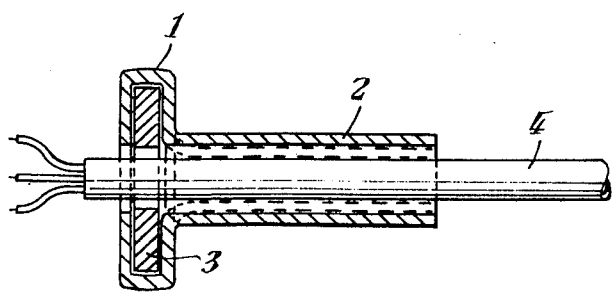
FIG. 1 is a sectional side elevation of a device with an electric cable before and after heat shrinking of the device onto the cable in accordance with this invention.

Referring to FIG. 1, an end portion 1 of a length of heat shrinkable sleeving or tubing 2 is provided internally with an annular disk 3, said disk being rigidly held in place within the tubing 2 by heat shrinking a portion of the tubing 2 over the peripheral regions of the disk 3. The heat shrinkable tubing may be preshaped to include a raised portion in its expanded state of suitable dimensions to include the annular disk; alternatively a raised portion of the heat shrinkable tubing may be formed around the annular disk only upon recovery of a portion of the heat shrinkable tubing.

An unrecovered portion of the tubing 2 may be rigidly attached to an electric cable 4 by heating the unrecovered portion of tubing 2 to the temperature at which it shrinks, whereupon the tubing 2 shrinks onto, and grips, the cable 4, thereby providing a raised circular portion on the outer surface of the cable 4. The position of the tubing 2 after shrinkage is shown by the dotted lines. If desired, the tubing 2 may be provided internally and coaxially with a tubing of a thermoplastic material that melts at or below the shrinking temperature of the tubing 2 to improve the bond between the cable 4 and the tubing 2.

Figure 2:
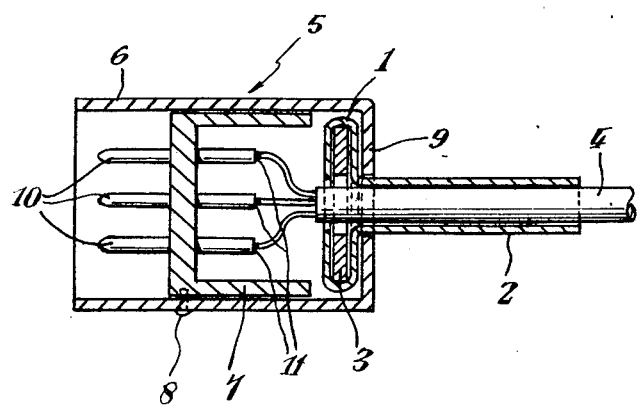
FIG. 2 is a side elevation, partly in section, of a plug connected to an electric cable onto which the device of FIG. 1 has been shrunk in accordance with the invention.

Referring to FIG. 2, a three-pin plug designated generally by reference numeral 5 comprises an outer casing 6 and an internal pin support 7 attached to the casing 6 by a screw 8. The rear wall 9 of the casing 6 has an aperture through which the electric cable 4 passes into the plug, the diameter of this aperture being less than that of the external diameter of the disk 3. The cable 4 is connected to plug pins 10 by connections 11 which may, for example, be solder joints. The length of the conductors between the connections 11 and the raised portion of the cable 4 should be such that when the raised portion of the cable is in abutment with the rear wall 9 of the casing 6, the conductors are not fully extended. Thus, axial stress applied to the cable, for example, by pulling it, imposes a strain on the plug casing 6 rather than on the connections 11.

Modifications and variations, such as the strain relief device being attached to cables other than plugs, e.g., microphones, will be readily apparent to those skilled in the art.

What is claimed as new and desired to be secured by Letters Patent of the United States:

1. A strain relief kit comprising:
   a plug member having a rear wall with a first aperture formed therein;
   a heat shrinkable sleeve having a first and second portion, said first portion being in a recovered state and said second portion being in an expanded state and forming a pathway capable of receiving an electrical cable, said second portion of said heat shrinkable sleeve capable of being positioned in said first aperture of said plug, and
   a disk having a diameter larger than said first aperture and having annular faces defining one centrally located second aperture, said first portion of said sleeve being recovered onto said faces, said second aperture being in alignment with said pathway thereby forming a further part of the pathway capable of receiving an electrical cable.

2. The kit of claim 1 wherein said disk is a metal.

3. The kit of claim 1 wherein said second portion of said sleeve is recovered onto said electrical conductor.

4. The kit of claim 1 wherein said first portion of said sleeve is in an expanded state.

5. The kit of claim 1 including a thermoplastic tubing, wherein said thermoplastic tubing is positioned internally to and coaxially with said heat shrinkable sleeve, said thermoplastic tubing melting at or below the temperature at which the heat shrinkable tubing is recovered.

6. The kit of claim 1 wherein said heat shrinkable sleeve is comprised of a polymer.

7. The kit of claim 1 wherein said plug is further provided with means for electrical connection to said electrical conductor.

8. The kit of claim 7 wherein said means are pins.

9. A strain relief device comprising:
   a plug member having a rear wall with a first aperture formed therein;
   a heat shrinkable sleeve having a first and second portion, said first portion being in a recovered state and said second portion being in an expanded state and forming a pathway capable of receiving an electrical cable, said second portion of said heat shrinkable sleeve positioned in said first aperture of said plug, and
   a disk having a diameter larger than said first aperture and having annular faces defining one centrally located second aperture, said first portion of said sleeve being recovered onto said faces, said second aperture being in alignment with said pathway thereby forming a further part of the pathway capable of receiving an electrical cable.

10. The device of claim 9 wherein said disk is a metal.

11. The device of claim 9 including a thermoplastic tubing, wherein said thermoplastic tubing is positioned internally to and coaxially with said heat shrinkable sleeve, said thermoplastic tubing melting at or below the temperature at which the heat shrinkable tubing is recovered.

12. The device of claim 9 wherein said heat shrinkable sleeve is comprised of a polymer.

13. The device of claim 9 wherein said plug is further provided with means for electrical connection to said electrical conductor.

14. The device of claim 13 wherein said means are pins.

* * * * *